(12) United States Patent
Tsuchida et al.

(10) Patent No.: US 6,633,456 B1
(45) Date of Patent: Oct. 14, 2003

(54) SUSPENSION, HEAD SUSPENSION ASSEMBLY, AND DISK DRIVE APPARATUS

(75) Inventors: Hiroyasu Tsuchida; Singo Tsuda, both of Yokohama; Sachiyo Baba, Yamato; Kiyoshi Satoh, Fujisawa, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/430,529

(22) Filed: Oct. 29, 1999

(30) Foreign Application Priority Data

Oct. 29, 1998 (JP) .......................... 10-308905

(51) Int. Cl.[7] ............................................. G11B 21/21
(52) U.S. Cl. ..................................................... 360/244.8
(58) Field of Search ........................ 360/244.2, 245, 360/244.8, 244.9

(56) References Cited

U.S. PATENT DOCUMENTS

| | | | | |
|---|---|---|---|---|
| 4,408,238 A | * | 10/1983 | Hearn ..................... | 360/265.9 |
| 4,723,186 A | * | 2/1988 | Nakajima et al. ........ | 360/244.9 |
| 4,884,154 A | * | 11/1989 | Onodera et al. ......... | 360/244.9 |
| 4,996,616 A | * | 2/1991 | Aoyagi et al. ............ | 360/244.9 |
| 5,353,181 A | * | 10/1994 | Frater et al. ............. | 360/245.3 |
| 5,719,727 A | * | 2/1998 | Budde ..................... | 360/244.9 |
| 5,724,211 A | * | 3/1998 | Higashiya et al. ....... | 360/244.4 |
| 5,808,836 A | * | 9/1998 | Frater et al. ............. | 360/244.9 |
| 5,815,348 A | * | 9/1998 | Danielson et al. ....... | 360/244.9 |
| 5,844,752 A | * | 12/1998 | Bozorgi et al. .......... | 360/244.9 |
| 5,991,122 A | * | 11/1999 | Tangren et al. .......... | 360/244.2 |
| 6,002,552 A | * | 12/1999 | Leung ..................... | 360/75 |
| 6,028,742 A | * | 2/2000 | Kazama ................... | 360/244.8 |
| 6,043,956 A | * | 3/2000 | Hanya ..................... | 360/244.9 |
| 6,104,572 A | * | 8/2000 | Williams et al. ......... | 360/244.9 |
| 6,115,220 A | * | 9/2000 | Khan et al. .............. | 360/244.2 |
| 6,141,187 A | * | 10/2000 | Wong et al. ............. | 360/244.8 |

FOREIGN PATENT DOCUMENTS

| | | | |
|---|---|---|---|
| EP | 0 338 698 A | 10/1989 | |
| JP | 62-076078 | 4/1987 | |
| JP | 63-183672 | 7/1988 | |
| JP | 01-277380 | 11/1989 | |
| JP | 04-285776 | 10/1992 | |
| JP | 5-174507 | 7/1993 | ........... G11B/21/02 |

OTHER PUBLICATIONS

Budde, U.S. SIR H1573, "Reduced Mass/Inertia Suspension".*

* cited by examiner

*Primary Examiner*—David Davis
*Assistant Examiner*—Franklin D. Altman
(74) *Attorney, Agent, or Firm*—Robert B. Martin; Bracewell & Patterson, L.L.P.

(57) ABSTRACT

In order to provide a suspension, a head suspension assembly, and a disk drive apparatus that can contribute to an increase of record and playback reliability, holes 3c in ribs 3b of the head suspension assembly 3 are provided. This design decreases the displacement of a head slider 2 that is caused by Karman vortex streets occurring near the ribs 3b in company with the rotation of the magnetic disk 1.

8 Claims, 7 Drawing Sheets

SUSPENSION, HEAD SUSPENSION ASSEMBLY, AND DISK DRIVE APPARATUS

BACKGROUND OF THE INVENTION

1. Field of the Invention

The present invention relates to a suspension, a head suspension assembly, and a disk drive apparatus that contribute to an increase in record and playback reliability.

2. Description of the Prior Art

In a hard disk drive (HDD) apparatus using a magnetic disk as a recording medium, record and playback is performed with a head slider not contacting the magnetic disk, by energizing the head slider, on which a head performing record and playback is mounted, toward the magnetic disk and using air flowing between the head slider and magnetic disk in conjunction with rotation of the magnetic disk, like bearings.

Typically, a head slider x1 is supported by a head suspension assembly (HSA) x2 shown in FIG. 2, and is energized toward the disk side by being loaded in the extent of, for example, 2 grams by the spring x3.

Because of the requirement for acceleration of seek speed and the like, lightening of the HSA x2 is desired while keeping its predetermined stiffness. For this reason, HSAs x2 that keep their stiffness by ribs x2b that are provided on both sides of the arm part x2a are commonly used.

Large capacity and acceleration of HDDs is also desirable due to recent performance advances of information processors. Therefore, it becomes necessary to decrease the space between disks, to increase rotational speed, and to increase the density of track pitches (TPI). Under these conditions, the influence of a mechanical resonance system on reliability and performance of an HDD becomes drastically large.

Along with an increase of the disk rotational speed or decrease of the space between disks, the airflow rate in the HDD becomes higher. If the airflow rate becomes higher, however, the influence of resonance generated in the HSA by the airflow cannot be disregarded.

If the airflow at high speed in laminar flow hits the rib of the HSA, a so-called Karman vortex street occurs in the downstream side of the rib, and the alternating force caused by this vortex street excites the vibration of the HSA to make the servo unstable.

An example of an apparatus solving this problem is a magnetic head suspension unit disclosed in Published Unexamined Patent Application No. 5-174507. This magnetic head suspension unit suppresses the occurrence of an eddy flow by making each rib have a cross-section of a laminar airfoil. Furthermore, a position where a boundary layer, where speed is sharply dropped due to viscosity near a surface of the airfoil, is exfoliated from the surface of the airfoil is retracted by making each rib hollow and providing pores in the surface of the rib while making the edge of the rib open. In addition, a plurality of pores lighten the unit.

Nevertheless, the magnetic head suspension unit disclosed in the Published Unexamined Patent Application No. 5-174507 has complicated construction. Therefore, the unit has a problem that production of the unit is difficult, and hence production cost becomes expensive.

The present invention is performed in consideration of the above problems, and provides a suspension, a head suspension assembly, and a disk drive apparatus that can have stable servo, and contribute to cost reduction owing to easy production.

SUMMARY OF THE INVENTION

A suspension according to the present invention comprises an arm part where a mounting part for mounting a head slider is formed at an edge thereof, a standing part that is provided along the longitudinal direction of the arm part and is provided for keeping stiffness of the arm part, and openings that are provided in the standing part having 10% or more of an opening ratio.

In addition, another suspension according to the present invention comprises an arm part where a mounting part for mounting a head slider is formed at an edge thereof, and a standing part provided along the longitudinal direction of the arm part at height approximately five times higher than the plate thickness of the arm part or less and is provided for keeping stiffness of the arm part.

Furthermore, still another suspension according to the present invention comprises an arm part where a mounting part for mounting a head slider is formed at an edge thereof, and a box part that is provided near the center of the arm part along the longitudinal direction of the arm part and is provided for keeping stiffness of the arm part.

DESCRIPTION OF THE PREFERRED EMBODIMENT

Figure 1:
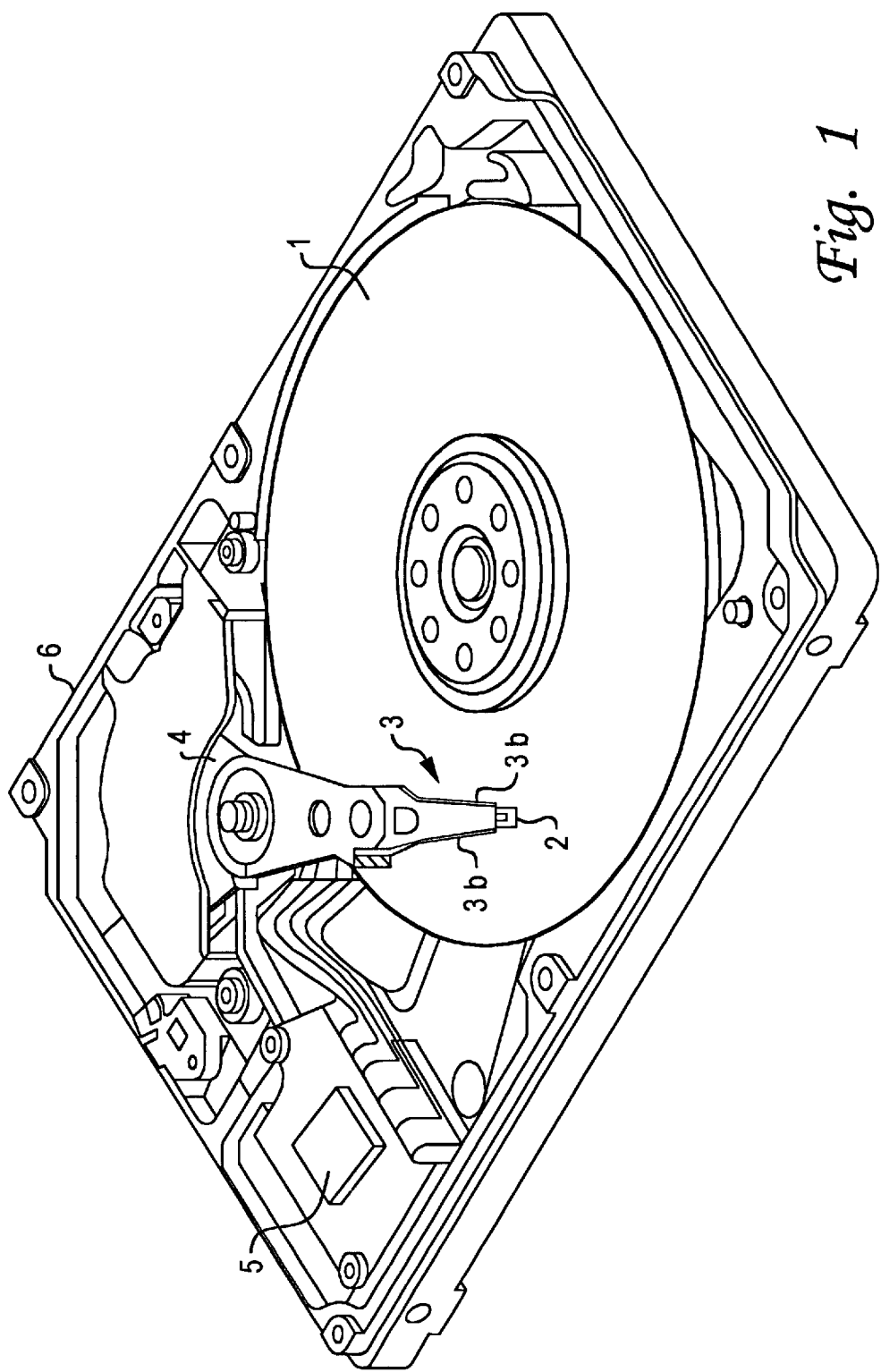
FIG. 1 is a perspective view showing the construction of a disk drive apparatus according to a first embodiment of the present invention.
Figure 2:
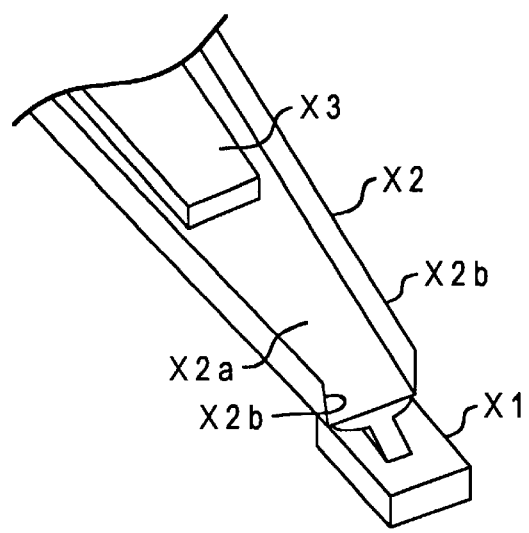
FIG. 2, is a perspective view showing the construction of a head suspension assembly used for constructing a conventional magnetic disk apparatus.

FIG. 1 is a perspective view showing the construction of a disk drive apparatus according to a first embodiment of the present invention.

This disk drive apparatus comprises a magnetic disk 1 for recording data, a head slider 2 where a head performing record and playback (writing and reading) on tracks of this magnetic disk 1 is mounted, a head arm (a head suspension assembly, hereinafter: this is simply called an HSA) 3 where the head slider 2 is mounted, a rotary actuator 4 moving the head slider 2 in an approximately radial direction of the magnetic disk 1 while rotatably driving the HSA 3, an arm electronics (AE) 5 comprising an amplifier for a playback output of the head, and a chassis 6 where the magnetic disks 1 through AE 5 are mounted.

In addition, this disk drive apparatus comprises a spindle motor driver controlling the rotation of the magnetic disk 1, a voltage-controlled motor driver (VCM driver) driving the rotary actuator 4, a playback/record (read/write) channel (R/W channel) performing reads of servo sectors, and read/ writes of data, a control program for controlling the operation of the entire disk drive apparatus, memory storing data and the like, a hard disk controller (HDC) controlling the entire disk drive apparatus, and a microprocessor unit (MPU) that has interfaces for a processor, the memory, and external devices and controls the input/output of commands and data for external devices. These spindle motor driver, VCM driver, R/W channel, memory, HDC, and MPU, and the like are mounted on a control board (not shown) mounted on the outside of the chassis 6.

Figure 3:
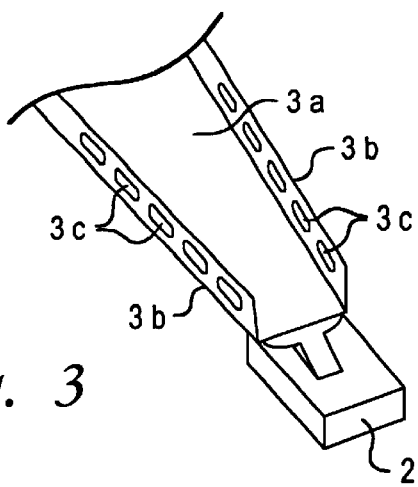
FIG. 3 is a perspective view showing the construction of a head suspension assembly constructing a disk drive apparatus according to the first embodiment of the present invention.
Figure 4:
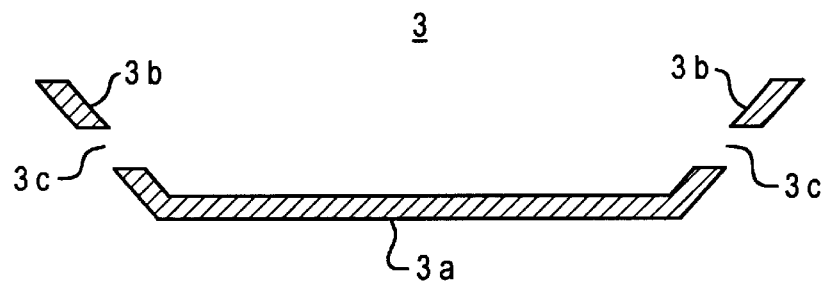
FIG. 4 is a side view showing the construction of the head suspension assembly.
Figure 5:
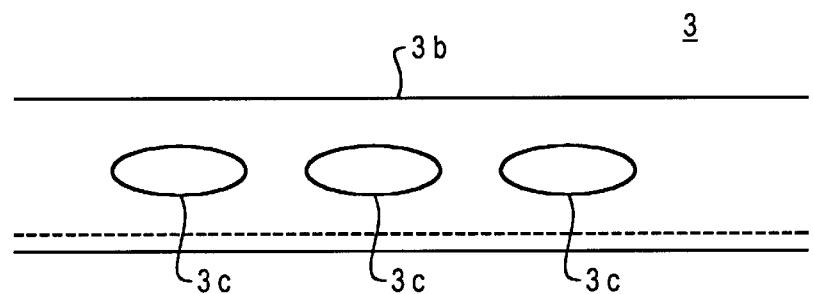
FIG. 5 is a sectional view showing the construction of the head suspension assembly.

FIGS. 3 through 5 are views showing the further detailed construction of the HSA 3. The HSA 3 comprises an arm part 3a having a shape that narrows towards an edge, and ribs 3b provided in both sides of the arm part 3a for maintaining stiffness. Holes 3c are provided in the rib 3b for decreasing the projected area of each rib.

Figure 6:
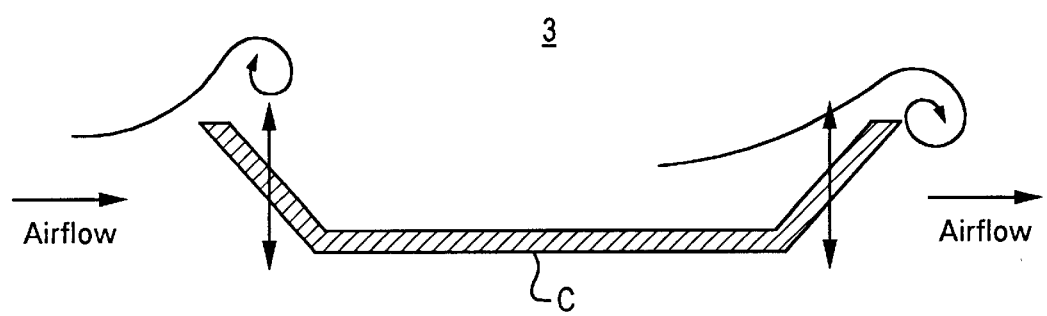
FIG. 6 is a sectional view conceptually showing Karman vortex alternating force acting on the head suspension assembly.

If the airflow caused by the rotation of the magnetic disks 1 hits the ribs 3b, Karman vortex streets occur in the downstream sides of the ribs 3b, as shown in FIG. 6.

The force occurring due to this vortex street becomes the alternating force making the HSA 3 vibrate in the pitching direction making the central shaft of the HSA 3 as a fulcrum. This alternating force is expressed in the following Equation:

$$F_k = \frac{1}{2} C_k \rho V^2 A \sin \omega t \qquad \text{(Equation 1)}$$

where $\rho$ and V show the density and flow rate of fluid respectively, and A shows the area receiving the fluid. In addition, $F_k$ is the Karman vortex force, and $C_k$ shows a Karman coefficient.

It can be seen from Equation 1 that the alternating force increases in proportion to the square of the flow rate of the fluid. Therefore, when the flow rate of air becomes high by the rotational speed of the magnetic disk 1 increasing or a space between disks decreasing, influence of the alternating force becomes large.

If the HSA 3 vibrates in the torsional direction (rolling direction) to its central shaft, the head slider 2 (more accurately, the position of the head mounted on the bottom of the head slider) is displaced in the direction of offtrack, that is, the direction of track width. Therefore, when the displacement of the head slider 2 becomes large, the reliability of record and playback decreases.

Figure 7:
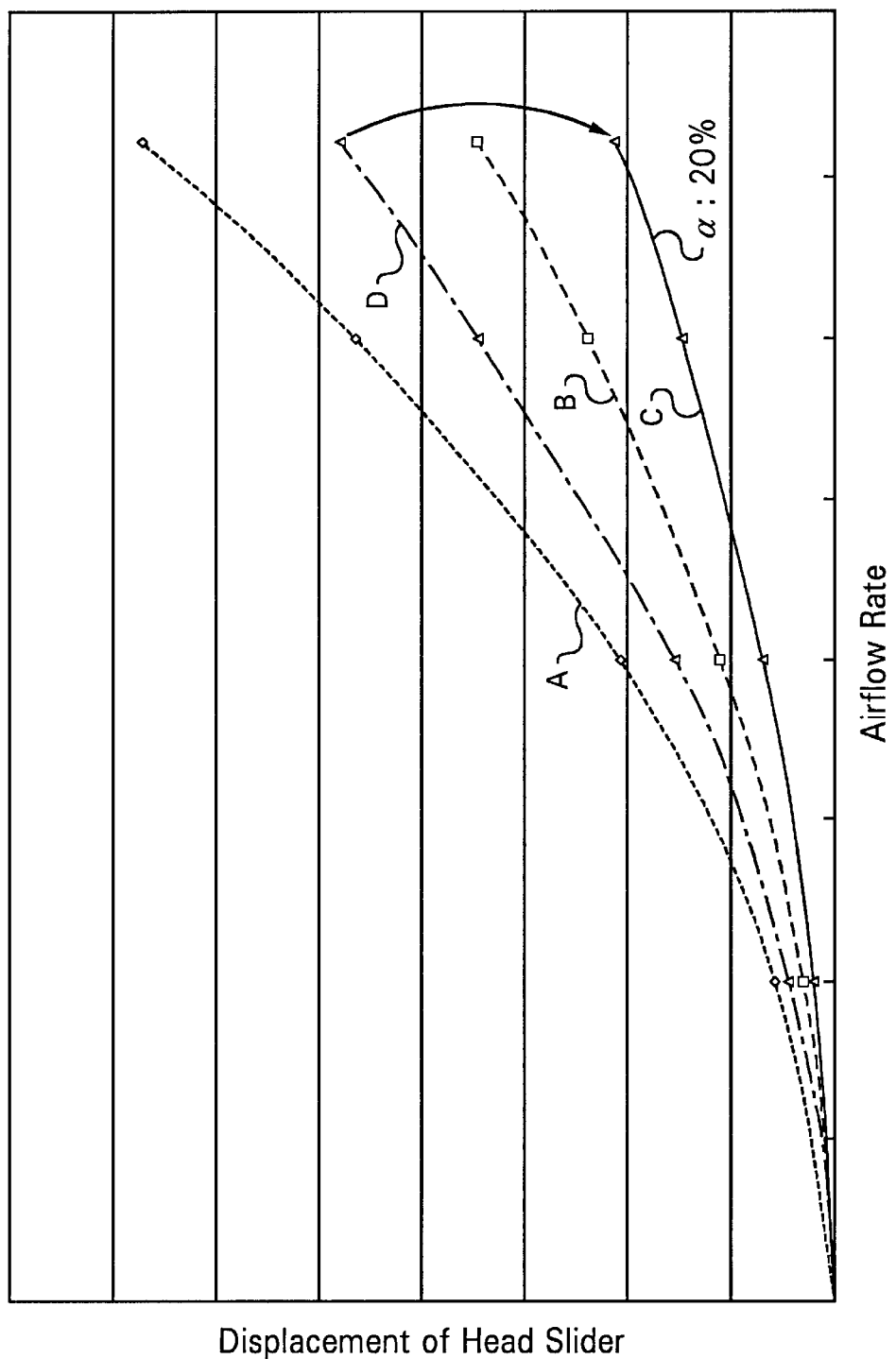
FIG. 7 is a graph showing the change of displacement of a head slider when rib height of the head suspension assembly is changed.

FIG. 7 shows the change of displacement of the head slider 2 by the alternating force when the flow rate of air is changed. Symbols A and B in the figure show the displacement of the head slider when an HSA having usual ribs and an HSA having ribs with height lower than that of the usual HSA are used, respectively.

In order to decrease the displacement of the head slider, it may be sufficient, for example, to decrease the alternating force by decreasing A in the above-described formula 1, that is, the area receiving the fluid (projected area). If the height of the ribs 3b is decreased so as to decrease the projected area, as clearly shown in FIG. 7, the displacement of the head slider 2 can be decreased.

In addition, in the case where an angle between the rib 3b and arm part 3a, as shown in FIG. 4, is made 90° or more without providing holes 3c, it also becomes possible to decrease the alternating force due to the Karman vortex street by decreasing the projected areas of the ribs 3b.

In this manner, by decreasing the projected areas by decreasing the height of ribs 3b, it becomes possible to decrease the displacement of the head slider 2 that is caused by the Karman vortex streets. Therefore, it becomes possible to contribute to the increase of reliability of record and playback.

The present inventor et al. found that, although depending on material, construction, and the like of the HSA, the displacement of the head slider 2 was worse when the height of the ribs 3b was six times (0.3 mm (300 μm)) higher than the plate thickness, for example, when the height of the ribs 3b was made 0.245 mm at the time the plate thickness was, 50 μm. For this reason, it is preferable to make the height of the ribs 3b approximately five times (in this case, 0.25 mm) higher than the plate thickness or less.

However, when determining the height of the ribs 3b, account must be taken of the processing limitations relating to plate thickness. In addition, since the stiffness of the HSA 3 decreases if the height of the ribs 3b becomes excessively low, the effect of providing the ribs 3b is lost.

For this reason, in this embodiment, by providing holes 3c in the ribs 3b of the HSA 3 as shown in FIGS. 4 and 5, the projected areas of the ribs 3b are made to decrease. The size of the holes 3c provided in the ribs 3b is made, for example, 10 μm or more in consideration of the viscosity of the airflow. In addition, it is preferable so as to maintain the stiffness that these holes 3c are small. Nevertheless, since the size not less than the plate thickness is necessary when forming the holes 3c by etching, the size is made approximately 60 μm if the plate thickness is, for example, 50 μm. Therefore, it is preferable that the size of the holes 3c be equal to or more than the plate thickness.

In addition, it is preferable so as to decrease the displacement of the head slider 2 that the opening ratio be large. Nevertheless, since the stiffness decreases if the ratio is excessively large, the ratio is made, for example, 10–50%, and preferably, 20% or more. Furthermore, at the time of the actual design, an optimum value is set in consideration of the maintenance of stiffness and the decrease of displacement of the head slider 2. For example, when the HSA 3 in predetermined shape was formed working a thin plate of stainless steel (SUS304TA, TA: Tension Anneal), the optimum value was approximately 20% in consideration of the maintenance of stiffness and the decrease of displacement of the head slider 2.

In regard to the HSA 3, when the change of displacement of the head slider 2 is obtained while the flow rate of air is made to change similarly to the above, the displacement of the head slider 2, as shown by C in FIG. 7, becomes small.

In addition, since the height of ribs 3b of this HSA 3 is at about the midpoint between the HSAs used for obtaining A and B in the figure, this HSA has a characteristic shown by D in the figure if the holes 3c are not provided. Therefore, it becomes possible not only to decrease the displacement of the head slider 2 in comparison with the case of decreasing the height of ribs, but also to maintain the stiffness while keeping the height of the ribs.

In the preferred embodiment of the disk drive apparatus, by providing the holes 3c in the ribs 3b of the HSA 3, it is possible to decrease the displacement of the head slider 2 that is caused by the Karman vortex streets occurring in the downstream sides of the ribs 3b. Therefore, it is possible to prevent the reliability of record and replay from decreasing by preventing the head slider 2 from being displaced toward the track error.

At the time of producing the HSA 3 described above, after forming the holes 3c by etching in the part of a plate-like member that corresponds to the ribs 3b, the ribs 3b are formed by press working.

Therefore, since only a process step of forming the holes 3c by etching is added to steps of producing conventional HSAs 3, it is possible to easily produce the HSAs, and hence, it is possible to contribute to cost reduction.

In addition, since the holes 3c are formed by etching, the shape of the holes 3c is not particularly limited, and hence the shape can be an ellipse whose major axis, as shown in FIG. 4, is in parallel to the longitudinal direction of the HSA 3, and the shape can be also an ellipse whose major axis is inclined to the longitudinal direction of the HSA 3.

Figure 8:
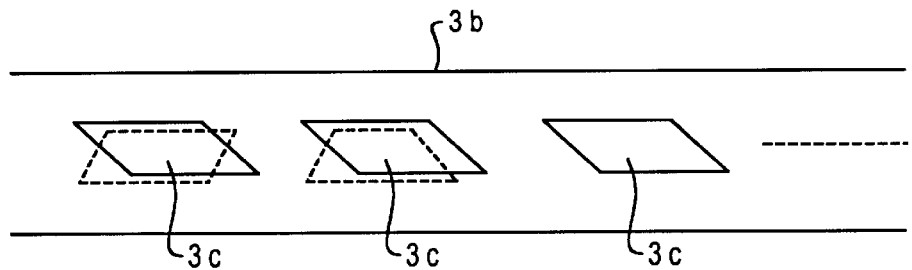
FIG. 8 is a side view of another constructive example of the head suspension assembly.

Furthermore, in consideration of etching characteristics, stiffness, and the like, it is desirable to have the shape of a parallelogram, a trapezoid, or the like, as shown in FIG. 8. Moreover, the shapes of the holes 3c are not limited to the same ones, but the shapes of a parallelogram, a trapezoid, or the like, as shown by a broken line in the figure, can be combined.

Figure 9:
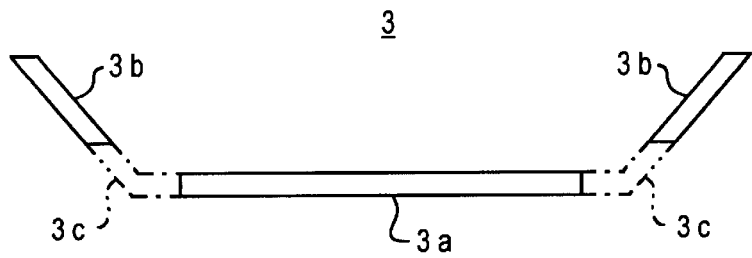
FIG. 9 is a sectional view showing another constructive example of the head suspension assembly.

In addition, the holes 3c extending from the ribs 3b to the arm part 3a, as shown in FIG. 9, can be provided without providing the holes 3c only in the ribs 3b. It becomes possible to easily further enlarge the opening ratio by providing such holes 3c.

As shown in FIG. 4, the angle of the ribs 3b is 90° or more to the arm part 3a. Therefore, the upper sides of the ribs 3b have a moment larger than that of the lower sides of the ribs 3b because the upper sides are apart from the vibration center of the HSA 3, that is, the central shaft of the HSA 3. Therefore, the upper sides contribute to the displacement of the head slider 2 more than the lower sides. For this reason, providing holes 3c in the upper sides of the ribs 3b can effectively decrease the displacement of the head slider 2, and is advantageous for keeping the stiffness.

In addition, in the arm part 3a of the HSA 3, vibration in the rotational direction with the central shaft of the arm part 3 near the actuator 4 as the center is limited. Hence, the amplitude of the vibration becomes large toward the ends of the ribs 3b. For this reason, as shown in FIG. 10, it becomes possible to effectively decrease the displacement of the head slider 2 by enlarging the opening ratio in the end portions of the ribs 3b in comparison with that in the base portion to make the force acting on the end portion of the HSA 3 comparatively weak.

Figure 10:
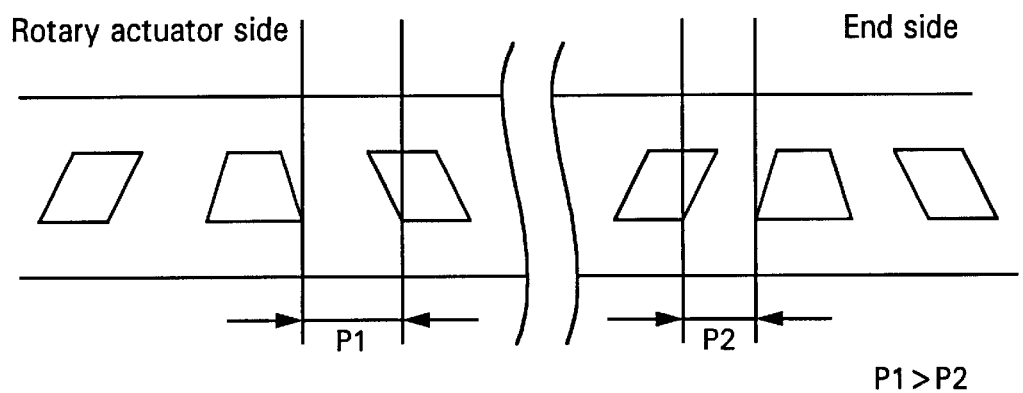
FIG. 10 is a side view showing still another constructive example of the head suspension assembly.
Figure 11:
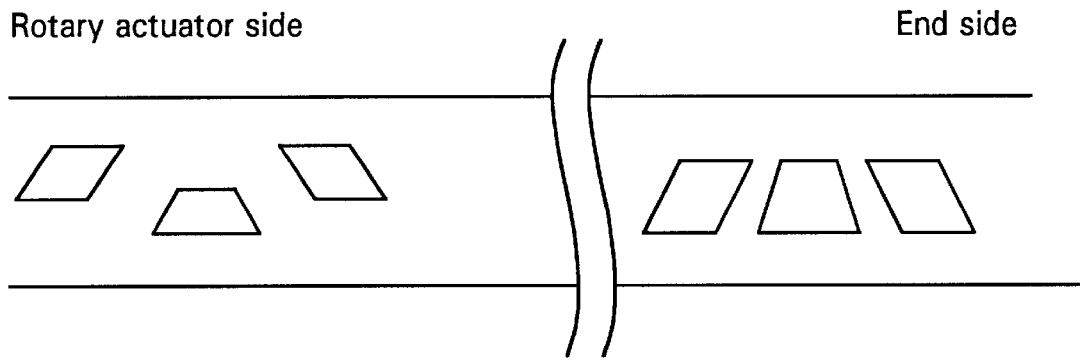
FIG. 11 is a side view showing a further constructive example of the head suspension assembly.

Furthermore, in the example shown in FIG. 10, the opening ratio is changed by changing the pitches of the holes 3c. Nevertheless, as shown in FIG. 11, methods of changing the opening ratio such as a method of changing the size of the holes 3c and a method of changing the number of openings are not particularly limited.

As described above, in this disk drive apparatus, it is possible to decrease the displacement of the head slider 2, which is caused by the Karman vortex streets occurring in the downstream sides of the ribs 3b, by providing the holes 3c in the ribs 3b of the HSA 3 to decrease the projected areas of the ribs 3b. Hence, it is possible to increase the reliability of record and playback.

If the space between magnetic disks 1 becomes narrow in company with downsizing and capacity increase of a disk drive apparatus by increasing the number of magnetic disks, the flow rate of air becomes high due to the viscosity of the air. Therefore, the decrease of reliability of record and playback that is caused by the Karman vortex streets becomes large. Hence, by suppressing the decrease of reliability of record and playback using the HSA 3 described above, it becomes possible to contribute to the downsizing and capacity increase of disk drive apparatuses.

Figure 12:
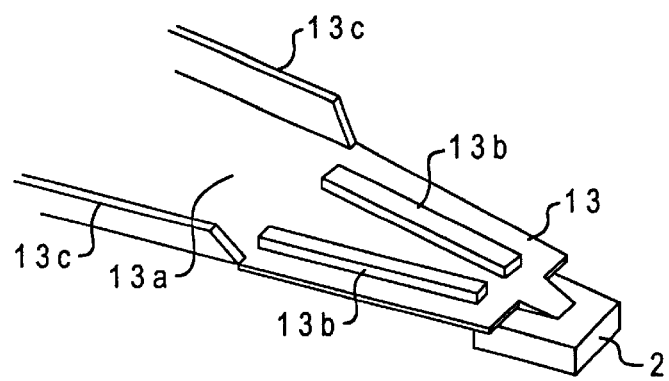
FIG. 12 is a perspective view showing the construction of a head suspension assembly constructing a disk drive apparatus according to a second embodiment of the present invention.
Figure 13:
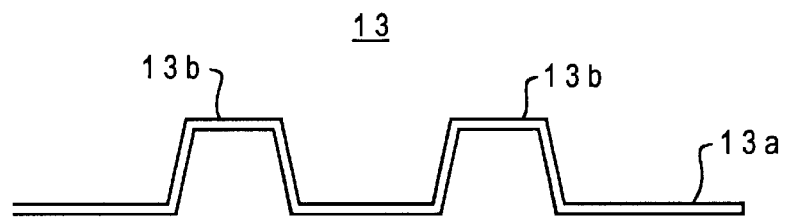
FIG. 13 is a sectional view showing the construction of the head suspension assembly.

In a disk drive apparatus according to a second embodiment of the present invention, an HSA 13 having the construction shown in FIGS. 12 and 13 instead of the HSA 3 shown in FIGS. 3 through 5 is used.

Although, in the first embodiment, the alternating force is suppressed by decreasing the projected areas of the ribs 3b receiving fluid, in this embodiment, the displacement of the head slider 2 is decreased by changing the position where the fluid is received to make the moment contributing to the vibration of the HSA 3 small.

The Karman vortex force becomes an alternating force vibrating the HSA 3 in the torsional direction (rolling direction) to the central shaft of the HSA 3 as described above. Therefore, by setting the position, receiving the fluid, in the vicinity of the central shaft of the HSA 3 to decrease the moment caused by the alternating forces the displacement of the head slider 2 can be decreased.

For this reason, in this HSA 13, a box part 13b having a U-shaped cross-part is provided in the vicinity of the central shaft of an end portion of the arm part 13a instead of the ribs 3b in FIGS. 3 through 5, as shown in FIG. 12. In addition, in the example shown in FIG. 12, ribs 13c are provided in the part of the arm part 13a near the rotary actuator 4.

Since, by providing the box part 13b, the stiffness of the HSA 13 is kept and the moment caused by the alternating force is decreased, it becomes possible to decrease the displacement of the head slider 2 similarly to the first embodiment. Hence, it becomes possible to contribute to the increase of reliability of record and playback. In addition, similarly to the first embodiment, it becomes possible to contribute to the downsizing and capacity increase of disk drive apparatuses.

Similar to the time when the ribs 3b in the HSA 3 in the first embodiment were provided, this box part 13b can be formed by press working. When the ribs 3b are formed, it is necessary to bend a plate-like member in the press working. Therefore, the height of the ribs 3b at some extent (for example, the height of the ribs 3b is 0.15–0.2 mm if the thickness of the member is 0.05 mm) is required. Nevertheless, the press working for forming the box part 13b is commonly called embossing, which can produce the box part 13b having the comparatively low height (under the similar conditions, to 0.05 mm or less). Therefore, it is easy to further decrease the displacement of the head slider 2 that is caused by the Karman vortex streets.

In addition, it is not necessary to perform the etching that was done in the first embodiment so as to form this HSA 13, and hence person-hours do not increase in comparison with a conventional one. Therefore, it is possible to contribute to cost reduction.

Furthermore, in the above description, since the arm part 12a is formed in the shape of being tapered off toward the end, the space between elements of the box part 13b becomes narrow toward the end. Since the moment becomes small as the position of the box part 13b nears the center of the arm part 12a, it becomes possible owing to adoption of this construction to further decrease the moment of the end portion that largely contributes to the displacement of the head slider 2. Therefore, it becomes possible to efficiently suppress the displacement of the head slider 2.

Figure 14:
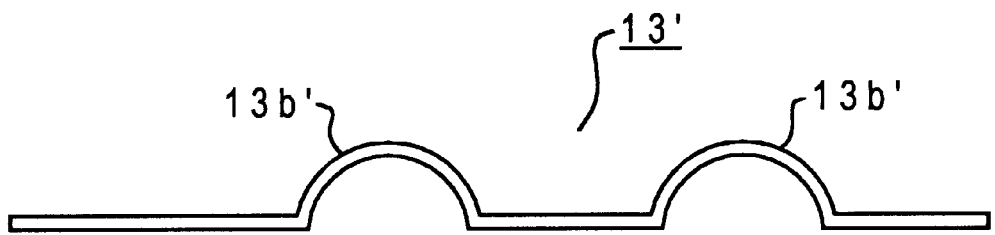
FIG. 14 is a sectional view showing another constructive example of the head suspension assembly.

In the above description, the sectional shape of elements of the box part 13b is described as being approximately unshaped. Nevertheless, it becomes possible to suppress the occurrence of the Karman vortex streets since the change of the flow rate in the downstream sides of the box part 13b' becomes continuous, as shown in FIG. 14, by making the sectional shape of the box part 13b' semicircle. Hence, it becomes possible to further decrease the displacement of the head slider 2. Owing to this, it becomes possible to contribute to the further increase of reliability of record and playback.

In addition, it is possible to decrease the vibration of the end portion of the arm part 13a that largely contributes to the displacement of the head slider 2 by lowering the height of the box part 13b toward the end portion. Owing to this, it becomes possible to further contribute to the increase of reliability of record and playback by further decreasing the displacement of the head slider 2.

Figure 15:
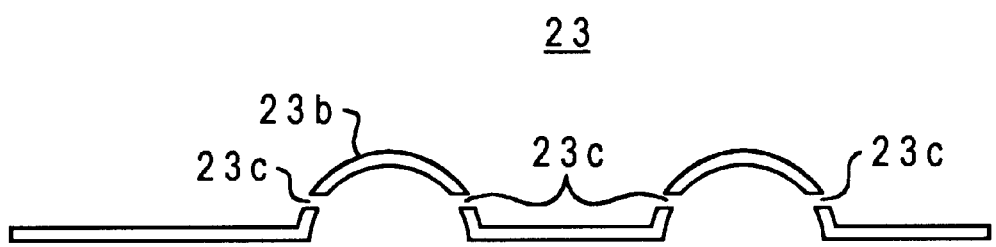
FIG. 15 is a sectional view showing the construction of a head suspension assembly constructing a disk drive apparatus according to a third embodiment of the present invention.

A disk drive apparatus according to a third embodiment of the present invention uses an HSA 23 having the construction shown in FIG. 15 instead of the HSA 13 shown in FIGS. 12 and 13.

This HSA 23 has further holes 23c provided in a box part 13b' of the HSA 13' having the shape shown in FIG. 14, and has projected areas decreased.

In this manner, similarly to the first embodiment, by decreasing the projected areas, it becomes possible to decrease the alternating force caused by the Karman vortex streets. Owing to this, it becomes possible to further decrease the displacement of the head slider 2 in comparison with the second embodiment. Hence, it becomes possible to increase the reliability of record and playback.

In addition, similar to the first and second embodiments, it becomes possible to contribute to the downsizing and capacity increase of disk drive apparatuses.

In the present invention, by providing openings, whose opening ratio is 10% or more, in a standing part designed for keeping the stiffness of the arm part, it is possible to decrease the displacement of a head slider that is caused by Karman vortex streets occurring in the downstream sides of the standing part. Hence, it is possible to contribute to an increase of reliability of record and playback.

Furthermore, by decreasing the displacement of the head slider that is caused by the Karman vortex streets, it is possible to contribute to the downsizing and capacity increase of disk drive apparatuses.

Moreover, in an invention according to another claim of the present invention, by setting a standing part, which is to keep the stiffness of an arm part, at the height of being six times higher than that of the arm part or less, it is possible to decrease the displacement of a head slider that is caused by the Karman vortex streets occurring in the downstream sides of the standing part. Therefore, it is possible to contribute to an increase of reliability of record and playback.

In addition, in an invention according to still another claim of the present invention, by forming a box part, designed for keeping the stiffness of the arm part, along the longitudinal direction in the vicinity of the center of the arm part, it is possible to decrease the displacement of a head slider that is caused by the Karman vortex streets occurring in the downstream sides of the box part. Therefore, it is possible to contribute to an increase of reliability of record and playback.

What is claimed is:

1. A suspension, comprising:
   an arm having a pair of side edges and a mounting portion, the arm being substantially planar such that it extends in and defines a longitudinal direction;
   a head slider mounted to the mounting portion of the arm;
   a rib extending in the longitudinal direction from each of the side edges of the arm to define a pair of ribs, the ribs being formed in substantially planar orientations at angles with respect to the arm to define transverse directions, thereby providing stiffness for the arm, and each of the ribs having a thickness and an area;
   a plurality of openings formed in each of the ribs, each of the openings having a longitudinal dimension, a transverse dimension, and an area, such that both of the longitudinal dimension is equal to or greater than the thickness of the ribs; and wherein
   the ribs have an opening ratio defined as a sum total of the areas of the openings over the areas of the ribs, the opening ratio being in a range of 10% to 50%.

2. The suspension of claim 1, wherein the opening ration is in the range of 20% to 50%.

3. The suspension of claim 1, wherein the areas of the openings increases toward the mounting portion of the arm.

4. The suspension of claim 1, wherein a number of the openings increases toward the mounting portion of the arm.

5. The suspension of claim 1, wherein adjacent ones of the openings are spaced apart by a pitch, and wherein the pitch between the openings decreases toward the mounting portion of the arm.

6. The suspension of claim 1, where in the openings have differing shapes selected from the group consisting of ellipses, parallelograms, and trapezoids.

7. The suspension of claim 1, wherein the arm and the ribs intersect to define junctions, and wherein the openings are located at the junctions such that portions of said openings are located on each of the arm and the ribs.

8. A suspension, comprising:
   an arm having a longitudinal direction, side edges extending in the longitudinal direction, a lateral direction that is transverse to the longitudinal direction, and a mounting part for mounting a head slider on the arm;
   a pair of ribs, each extending along one of the side edges of the arm in the longitudinal direction for providing stiffness to the arm, the ribs terminating on the arm and spaced apart from the mounting part in the longitudinal direction;
   a box portion located on the arm and extending in the longitudinal direction, the box portion being spaced apart from the ribs in the lateral direction, and spaced apart from the mounting part in the longitudinal direction, the box part having a U-shaped cross-sectional profile that defines a protrusion on one surface of the arm part, and a recess on an opposite surface of the arm part; and
   a plurality of apertures formed in the box portion.

* * * * *